(12) United States Patent
Tanaka et al.

(10) Patent No.: US 11,774,985 B2
(45) Date of Patent: Oct. 3, 2023

(54) ARITHMETIC PROCESSING DEVICE AND WIRELESS CONTROLLED AIRPLANE

(71) Applicant: Futaba Corporation, Mobara (JP)

(72) Inventors: Masahiro Tanaka, Mobara (JP); Nicholas Edward Maxwell, Schaumburg, IL (US)

(73) Assignee: Futaba Corporation, Mobara (JP)

( * ) Notice: Subject to any disclaimer, the term of this patent is extended or adjusted under 35 U.S.C. 154(b) by 137 days.

(21) Appl. No.: 17/466,758

(22) Filed: Sep. 3, 2021

(65) Prior Publication Data
US 2022/0075390 A1 Mar. 10, 2022

(30) Foreign Application Priority Data
Sep. 4, 2020 (JP) .................. 2020-148992

(51) Int. Cl.
| | | |
|---|---|---|
| *B64C 39/02* | (2023.01) | |
| *G05D 1/10* | (2006.01) | |
| *G05B 6/02* | (2006.01) | |
| *G05D 1/00* | (2006.01) | |
| *B64U 10/25* | (2023.01) | |
| *G05D 1/08* | (2006.01) | |

(52) U.S. Cl.
CPC ......... *G05D 1/0808* (2013.01); *B64C 39/024* (2013.01); *G05B 6/02* (2013.01); *G05D 1/0022* (2013.01); *G05D 1/101* (2013.01); *B64U 10/25* (2023.01); *B64U 2201/20* (2023.01)

(58) Field of Classification Search
CPC .... G05D 1/0808; G05D 1/0022; G05D 1/101; B64C 39/024; G05B 6/02; B64U 2201/20; B64U 10/25
See application file for complete search history.

(56) References Cited

U.S. PATENT DOCUMENTS

| | | | | |
|---|---|---|---|---|
| 2013/0006448 A1* | 1/2013 | Callou | ................... | A63H 27/12 701/5 |
| 2013/0173088 A1* | 7/2013 | Callou | .................. | B64C 39/024 701/2 |

FOREIGN PATENT DOCUMENTS

| | | |
|---|---|---|
| CN | 102847324 A | 1/2013 |
| JP | 2014-223158 A | 12/2014 |

* cited by examiner

*Primary Examiner* — Anne Marie Antonucci
*Assistant Examiner* — Jingli Wang
(74) *Attorney, Agent, or Firm* — Quarles & Brady LLP (57) ABSTRACT

An objective of the present invention is to achieve a roll flight of a wireless controlled airplane with a simple control operation. An arithmetic processing device according to the present invention includes an arithmetic section configured to calculate control amounts for correcting a change amount around a pitch axis and a change amount around a yaw axis for a wireless controlled airplane depending on a change amount for a roll axis for the wireless controlled airplane.

9 Claims, 5 Drawing Sheets

REFERENCE POSE

ARITHMETIC PROCESSING DEVICE AND WIRELESS CONTROLLED AIRPLANE

CROSS-REFERENCE TO RELATED APPLICATIONS

This application claims the priority benefit of Japanese Patent Application No. 2020-148992 filed on Sep. 4, 2020, which is fully incorporated herein by reference.

BACKGROUND OF THE INVENTION

Technical Field

The present invention relates to a technical field of a wireless controlled airplane configured to be controlled via wireless communication.

Background Art

Wireless controlled airplanes are known which are configured to fly via wireless communication e.g. based on operation by a control device. Patent Document 1 discloses a wireless controlled airplane configured to be controlled via wireless communication, wherein the wireless controlled airplane includes a horizontal tail which is attachable/detachable together with an airframe block to/from a main body, the airframe including a servo motor installed therein. Such a wireless controlled airplane performs various acrobatic flights e.g. for entertainment of the audience and/or competition in control techniques.

CITATION LIST

Patent Literature

Patent Document 1: JP 2014-223158 A

SUMMARY OF THE INVENTION

One of known acrobatic flights is a roll flight which is performed while rotating an airframe around a roll axis. During the roll flight of the airframe, an altitude of the airframe may be increased or reduced only with operation around the roll axis during the roll flight, so that it is required to operate the airframe around a pitch axis and a yaw axis by an operator in parallel to the operation around the roll axis. Since the rotation of the airframe is accompanied by rotations around the pitch axis and yaw axis at this time, the operator must operate it under taking current positions around the pitch axis and yaw axis into account. However, such operation requires many experiences and/or high techniques, and is thus highly difficult to control for ordinary operators.

Therefore, an objective of the present invention is to achieve a stable roll flight of a wireless controlled airplane by simple operation.

An arithmetic processing device according to the present invention includes an arithmetic section configured to calculate control amounts for correcting a change amount around a pitch axis and a change amount around a yaw axis for a wireless controlled airplane depending on a change amount for a roll axis for the wireless controlled airplane. This enables the change amount around the pitch axis and the change amount around the yaw axis to be prevented from being affected by the change amount around the roll axis for the wireless controlled airplane.

For the arithmetic processing device according to the present invention, it is conceivable that an angle around the roll axis from a reference pose to a current pose for the wireless controlled airplane is calculated as the change amount by an integrating operation with an angular speed around the roll axis for the wireless controlled airplane. As a result, a vector for each of the change amount around the pitch axis and the change amount around the yaw axis is resolved into an imaginary term and a real term based on the angle around the roll axis, wherein a control amount for the airframe in a direction of gravity is calculated by adding the real term for the pitch axis to the imaginary term for the yaw axis, and a control amount for the airframe in a horizontal direction is calculated by means of a difference between the imaginary term for the pitch axis and the real term for the yaw axis. As used herein, the term "reference pose" refers to a pose of a wireless controlled airplane which forms a start point for detecting an angular speed around the roll axis for use in calculating of the correction control amounts.

For the arithmetic processing device according to the present invention, it is conceivable that calculation of the control amounts is initiated upon a signal based on operation by an operator of the wireless controlled airplane. This enables that it is switched via operation by an operator whether calculation of the control amounts is carried out or not.

For the arithmetic processing device according to the present invention, it is conceivable that calculation of the control amounts is initiated based on a comparison of the change amount around the roll axis with a predetermined threshold. This enables that it is automatically switched depending on the change amount around the roll axis for the wireless controlled airplane during flight whether calculation of the correction control amounts is carried out or not.

A wireless controlled airplane according to the present invention is configured to be controlled via wireless communication and includes an arithmetic processing device, wherein the arithmetic processing device is configured to calculate control amounts for correcting a change amount around a pitch axis and a change amount around a yaw axis for the wireless controlled airplane depending on a change amount for a roll axis for the wireless controlled airplane. The wireless controlled airplane including the arithmetic processing device can also achieve effects which are similar to those of the arithmetic processing device according to the present invention as described above.

The present invention can achieve a roll flight of a wireless controlled airplane with a simple control operation.

DETAILED DESCRIPTION OF THE PREFERRED EMBODIMENTS

Hereinafter, an embodiment of the present invention will be described in the following points in this sequence:

<1. Summary of a Flight Control System>
<2. Configuration of a Wireless Controlled Airplane>
<3. Exemplar Processes in an Arithmetic section>
<4. Conclusion and Exemplar Variations>

It is to be noted that the following description will refer to the Drawings which show only features which are essential for the present invention. The Drawings are merely schematic, wherein a relation between a thickness and a plan dimension of each of the features as well as their ratio and others are merely illustrative. Furthermore, the features shown in the Drawings may be modified in various manners e.g. depending on the design within a scope which does not depart from the technical idea of the present invention. It is to be further noted that features and/or processes which have been described once may be designated with same reference signs and repeating the corresponding description may be omitted in the following description.

Furthermore, it is to be understood that the present invention is not limited to the following embodiment, but includes modifications and/or alterations etc., which fall within a scope that may achieve the objective of the present invention.

<1. Summary of a Flight Control System>

Now, a summary of a flight control system 100 according to the present embodiment will be described with reference to FIG. 1. For example, the flight control system 100 is constituted with a wireless controlled airplane 1 and a control device 2. In the following description, an axis extending through an airframe of the wireless controlled airplane 1 from a front side to a back side shall be a roll axis. Further, an axis extending the airframe from an upper side to a lower side shall be a yaw axis. Furthermore, an axis extending the airframe from the right to the left shall be a pitch axis.

The wireless controlled airplane 1 is capable of wireless communication with the control device 2 and configured to perform various actions depending on input operation to the control device 2 by an operator. The wireless controlled airplane 1 is provided e.g. with main wings 3, horizontal tails 4, and vertical tails 5. The main wings 3 include ailerons 6 which are operated e.g. for rotating the airframe around the roll axis. Furthermore, the horizontal tails 4 include elevators 7 which are operated e.g. for rotating the airframe around the pitch axis. Moreover, the vertical tails 5 include rudders 8 which are operated e.g. for rotating the airframe around the yaw axis. A flight pose of the wireless controlled airplane 1 can be changed by operating the ailerons 6, elevators 7 and rudders 8.

In the following description, rotating the airframe around the roll axis (with respect to the roll axis) may be referred to as "roll axis rotation". Further, rotating the airframe around the pitch axis (with respect to the pitch axis) may be referred to as "pitch axis rotation". Moreover, rotating the airframe around the yaw axis (with respect to the yaw axis) may be referred to as "yaw axis rotation".

<2. Configuration of a Wireless Controlled Airplane>

Figure 2:
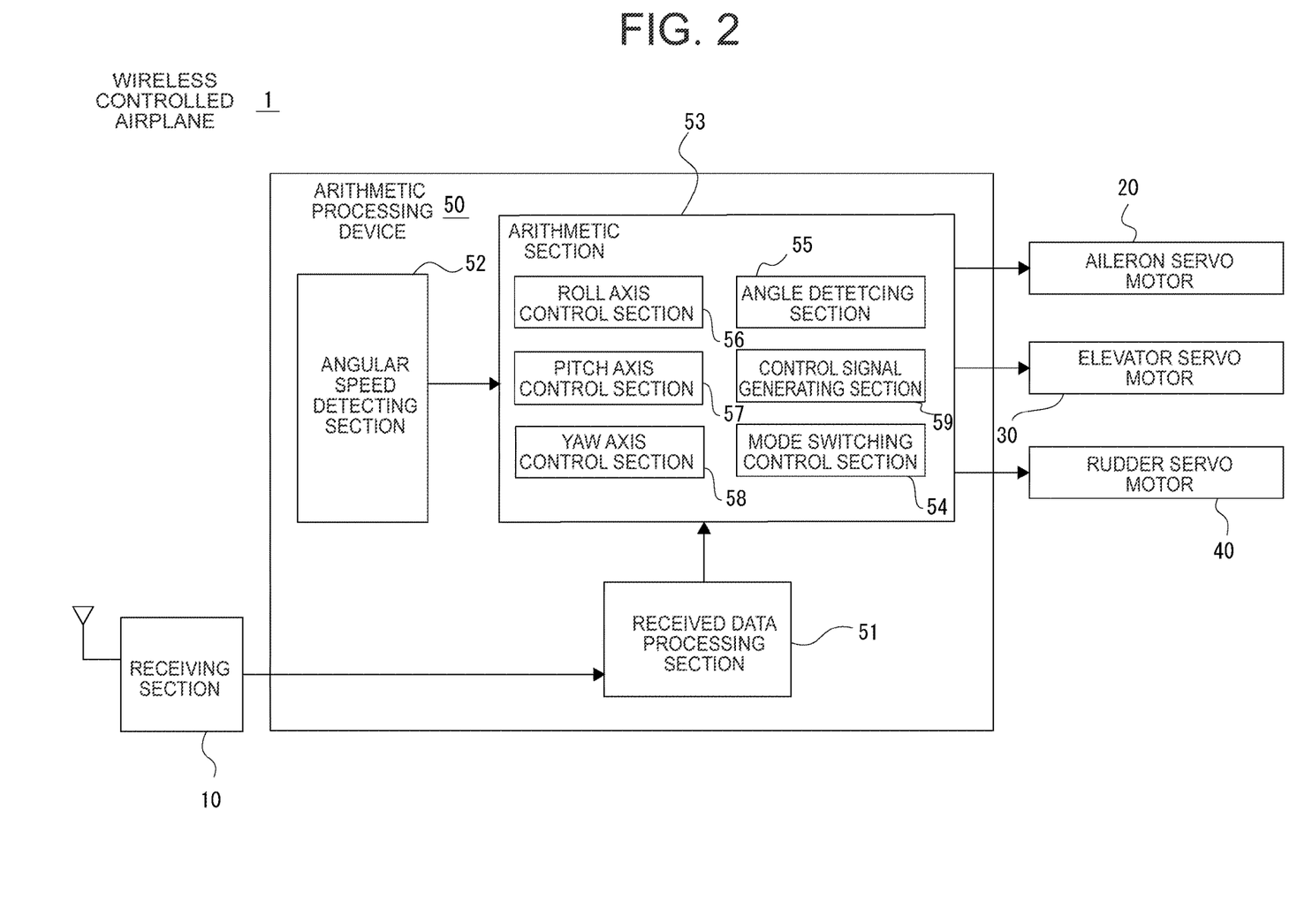
FIG. 2 shows a block diagram for configuration of a wireless controlled airplane according to the embodiment.

A configuration of the wireless controlled airplane 1 according to the present embodiment will be described with reference to FIG. 2. The wireless controlled airplane 1 includes a receiving section 10, an aileron servo motor(s) 20, an elevator servo motor(s) 30, a rudder servo motor(s) 40 and an arithmetic processing device 50.

The receiving section 10 receives an operation signal related to an operation amount of each of the servo motors (hereinafter referred to simply as "operation signal") and a signal related to a gain setting for use in PID (Proportional-Integral-Differential) control as described below (hereinafter referred to simply as "gain setting signal"), wherein the operation signal and the gain setting signal are based on an input operation inputted by the operator and received from the control device 2, wherein the receiving section 10 provides a decoded received data to the arithmetic processing device 50.

Figure 1:
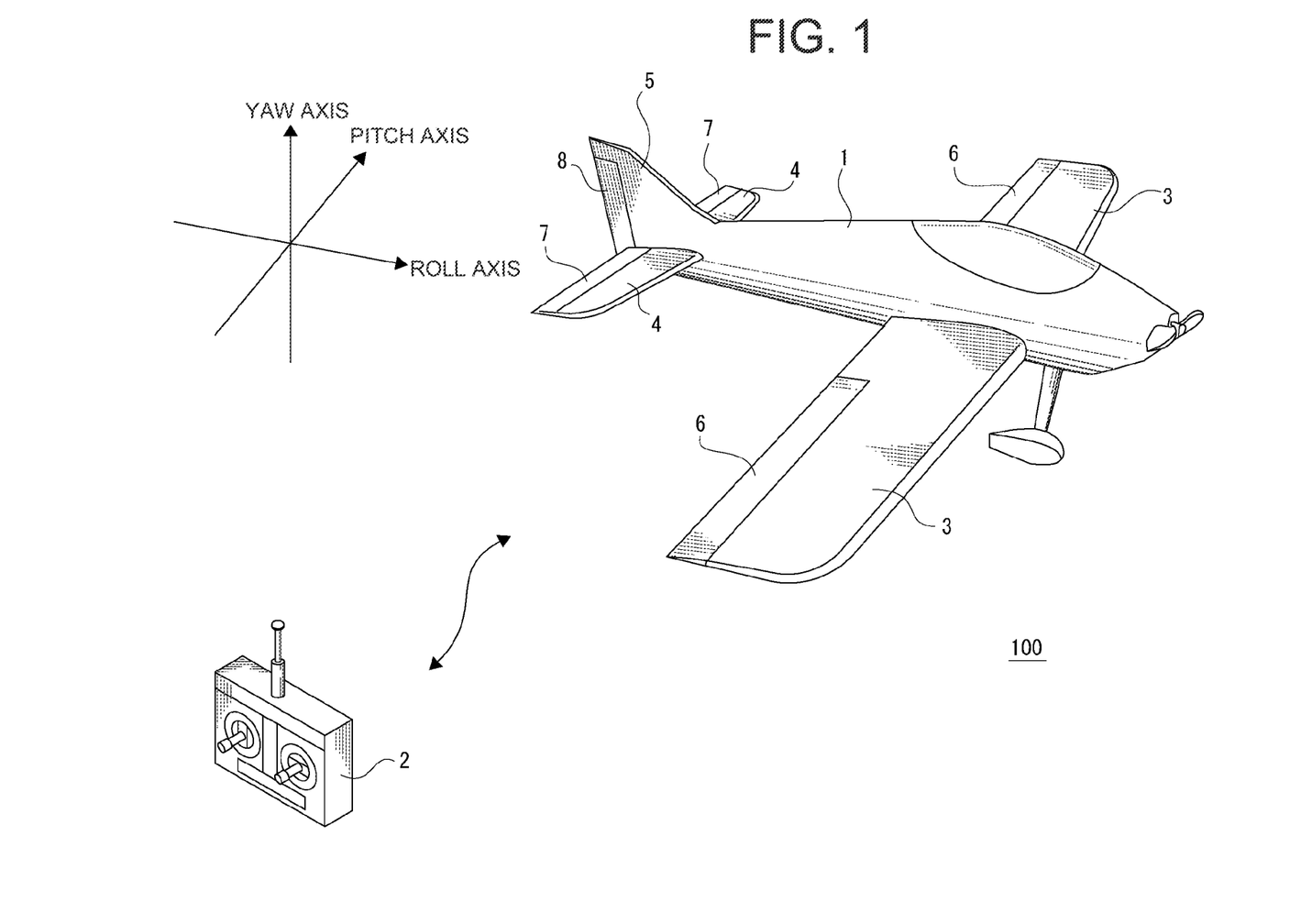
FIG. 1 shows a flight control system according to an embodiment of the present invention.

The aileron servo motor 20 operates the aileron 6 as shown in FIG. 1 based on a driving control signal from the arithmetic processing device 50 e.g. for rotating the wireless controlled airplane 1 around the roll axis. The elevator servo motor 30 operates the elevator 7 based on a driving control signal from the arithmetic processing device 50 e.g. for rotating the wireless controlled airplane 1 around the pitch axis. The rudder servo motor 40 operates the rudder 8 based on a driving control signal from the arithmetic processing device 50 e.g. for rotating the wireless controlled airplane 1 around the yaw axis.

The arithmetic processing device 50 includes a received data processing section 51, an angular speed detecting section 52 and an arithmetic section 53. The received data processing section 51 identifies the operation signal and the gain setting signal from codes of the received data provided by the receiving section 10. The received data processing section 51 outputs the various identified signals to the arithmetic section 53.

The angular speed detecting section 52 includes e.g. a roll axis angular speed sensor for detecting an angular speed of rotation around the roll axis (roll axis angular speed), a pitch axis angular speed sensor for detecting an angular speed of rotation around the pitch axis (pitch axis angular speed), and a yaw axis angular speed sensor for detecting an angular speed of rotation around the yaw axis (yaw axis angular speed). The angular speed detecting section 52 outputs data of the roll axis angular speed, pitch axis angular speed and yaw axis angular speed detected by the various angular speed sensors, to the arithmetic section 53.

For example, the arithmetic section 53 is constituted with a microcomputer having e.g. a CPU (Central Processing Unit), ROM (Read Only Memory), RAM (Random Access Memory), and has functions as a mode switching control section 54, an angle detecting section 55, a roll axis control section 56, a pitch axis control section 57, a yaw axis control section 58 and a control signal generating section 59.

The mode switching control section 54 switches a normal control mode and a roll flight control mode depending on a predetermined condition, wherein the normal control mode and the roll flight control mode are provided as control modes which can be set for control of the wireless controlled airplane 1. The condition for switching the modes will be described in details later.

The angle detecting section 55 calculates a rotation angle around the roll axis from a reference pose to a current pose of the wireless controlled airplane 1 (roll axis angle), wherein the rotation angle is calculated by integrating operation of a change amount of the roll axis angular speed for each constant time, the roll axis angular speed having been output from the angular speed detecting section 52. The angle detecting section 55 further calculates a rotation angle around the pitch axis from the reference pose to the current pose (pitch axis angle), wherein the rotation angle is calculated by integrating operation of a change amount of the pitch axis angular speed for each constant time. Furthermore, the angle detecting section 55 calculates a rotation angle around the yaw axis from the reference pose to the current pose (yaw axis angle), wherein the rotation angle is calculated by integrating operation of a change amount of the yaw axis angular speed for each constant time. As used herein, the term "reference pose" refers to a pose of the wireless controlled airplane 1 which forms a reference for calculating the rotation angle of the airframe around each of the axes, wherein the reference pose is set e.g. as a pose of the wireless controlled airplane 1 at the time of turning on the power supply. By way of example, the reference pose of the wireless controlled airplane 1 according to the present embodiment shall be set as a horizontal orientation of the wireless controlled airplane 1.

The roll axis control section 56 calculates a rotation angle of the airframe around the roll axis (target angle) based on the operation amount of the input operation by the operator in the normal control mode and the roll flight control mode. The roll axis control section 56 calculates each of terms for PID control (a proportional term Pr, an integral term Ir and a derivative term Dr) based on a difference between the calculated target angle around the roll axis and the roll axis angle calculated by the angle detecting section 55 at a given point of time.

The PID control as used herein is a method for determining a control amount based on the proportional term P, integral term I and derivative term D. In the present example, the PID control is performed for each of the axes. The terms for the PID control will be described with reference to the roll axis as an example. The proportional term P for the PID control is obtained e.g. by multiplying a deviation with a predetermined proportional gain Kp, wherein the deviation is obtained by subtracting the roll axis angle from the target angle around the roll axis at the point of time. The integral term I is obtained e.g. by multiplying an integral value by a predetermined integral gain Ki, wherein the integral value is obtained by integrating the deviation. The derivative term D is obtained e.g. by multiplying a derivative value with a predetermined derivative gain Kd, wherein the derivative value is obtained via differentiation of the deviation. For the pitch axis and the yaw axis, the proportional term P, integral term I and derivative term D can be calculated in a similar manner.

According to the present embodiment, the proportional term P, integral term I and derivative term D calculated for the PID control for each of the axes shall be referred to as the proportional term Pr, integral term Ir and derivative term Dr for the roll axis, as a proportional term Pp, integral term Ip and derivative term Dp for the pitch axis, and as a proportional term Py, integral term Iy and derivative term Dy for the yaw axis. Further, in the case where they do not need to be distinguished for different axes, they may be also referred to simply as the proportional term P, integral term I and derivative term D.

The pitch axis control section 57 calculates a rotation angle of the airframe around the pitch axis (target angle) based on a converted operation amount in the normal control mode, wherein the converted operation amount is obtained via conversion of the input operation by the operator. The pitch axis control section 57 calculates each of terms for PID control (the proportional term Pp, the integral term Ip and the derivative term Dp) based on a difference between the calculated target angle around the pitch axis and the pitch axis angle calculated by the angle detecting section 55 at a given point of time.

The yaw axis control section 58 calculates a rotation angle of the airframe around the yaw axis (target angle) based on a converted operation amount in the normal control mode, wherein the converted operation amount is obtained via conversion of the input operation by the operator. The yaw axis control section 58 calculates each of terms for PID control (the proportional term Py, the integral term Iy and the derivative term Dy) based on a difference between the calculated target angle around the yaw axis and the yaw axis angle calculated by the angle detecting section 55 at a given point of time.

The control signal generating section 59 calculates a control amount for correcting the operation of the aileron servo motor 20 in the normal control mode based on the proportional term Pr, integral term Ir and derivative term Dr calculated by the roll axis control section 56. The control signal generating section 59 further calculates a control amount for correcting the operation of the elevator servo motor 30 in the normal control mode based on the proportional term Pp, integral term Ip and derivative term Dp calculated by the pitch axis control section 57. Furthermore, the control signal generating section 59 calculates a control amount for correcting the operation of the rudder servo motor 40 in the normal control mode based on the proportional term Py, integral term Iy and derivative term Dy calculated by the yaw axis control section 58. Then, the control signal generating section 59 generates control signals based on the control amounts for the respective servo motors.

Figure 3:
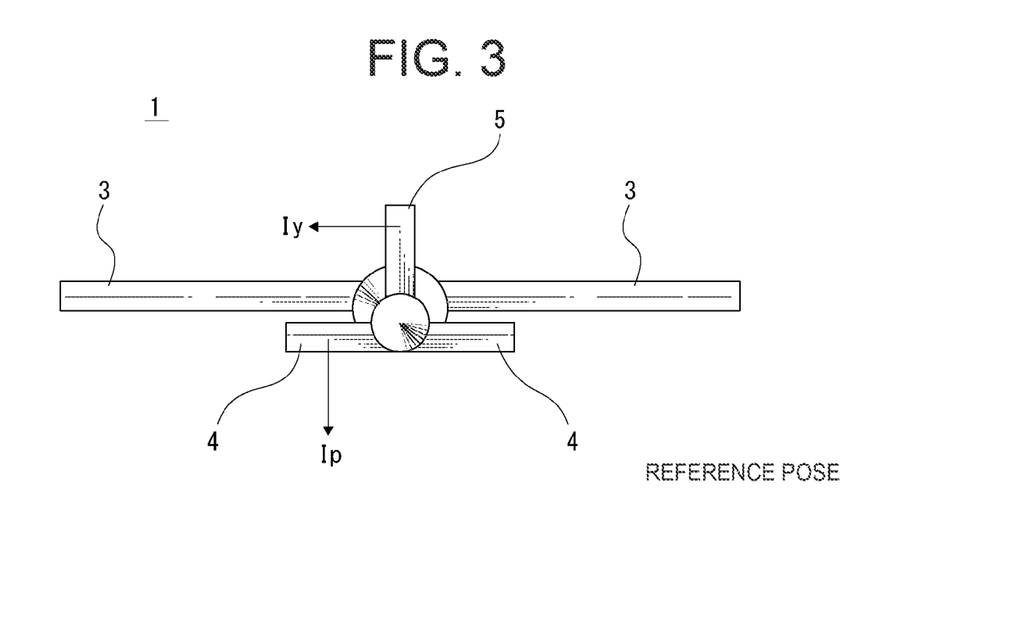
FIG. 3 shows integral terms of a pitch axis and a yaw axis for the wireless controlled airplane having a reference pose according to the embodiment.
Figure 4:
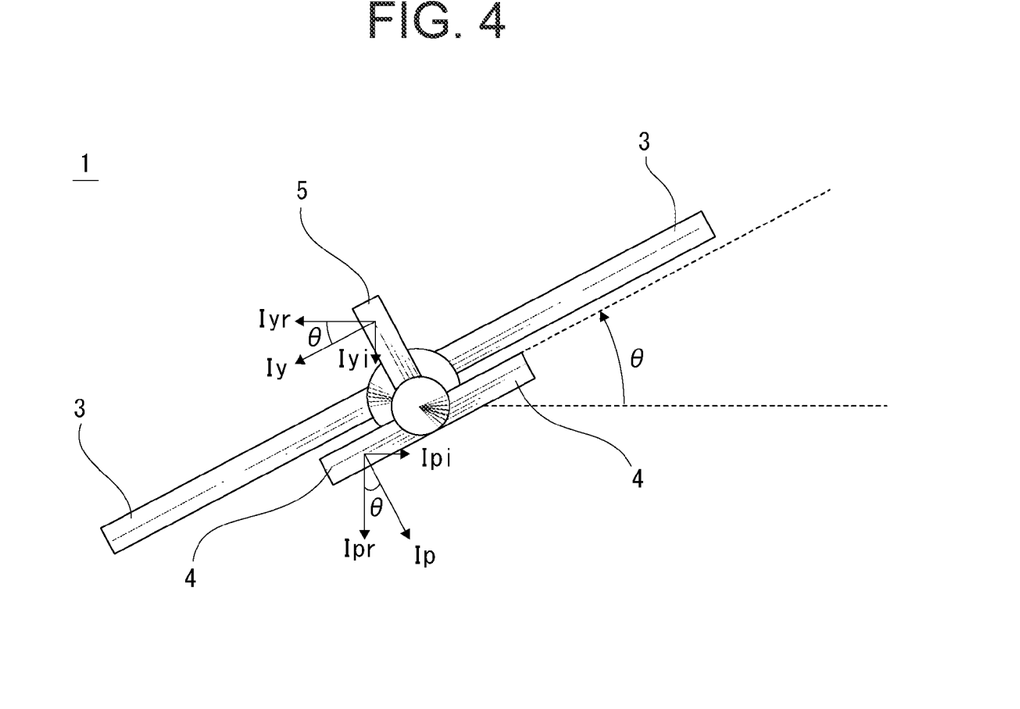
FIG. 4 shows integral terms of the pitch axis and the yaw axis for the wireless controlled airplane according to the embodiment which has been rotated around a roll axis from the reference pose.

On the other hand, the pitch axis control section 57 calculates the proportional term Pp, integral term Ip and derivative term Dp for the PID control in the roll flight control mode based on the difference between the target angle around the pitch axis and the pitch axis angle calculated by the angle detecting section 55. Then, the pitch axis control section 57 resolves a vector for the integral term Ip into an imaginary term Ipi for a horizontal direction and a real term Ipr for a direction of gravity based on the roll axis angle. For example, as shown in FIGS. 3 and 4, the imaginary term Ipi and the real term Ipr are calculated according to the following [Formula 1] and [Formula 2] by substituting the roll axis angle for a variable θ for the control amount of the integral term Ip, wherein the roll axis angle is measured starting from a reference position of the wireless controlled airplane 1 as shown in FIG. 3:

$$Ipi = Ip * \sin \theta \quad \text{[Formula 1]}$$

$$Ipr = Ip * \cos \theta \quad \text{[Formula 2]}$$

The yaw axis control section 58 calculates the proportional term Py, integral term Iy and derivative term Dy for the PID control in the roll flight control mode based on the difference between the target angle around the yaw axis and the yaw axis angle calculated by the angle detecting section 55. Then, the yaw axis control section 58 resolves a vector for the integral term Iy into an imaginary term Iyi for the direction of gravity and a real term Iyr for the horizontal direction based on the roll axis angle. For example, as shown in FIGS. 3 and 4, the imaginary term Iyi and the real term Iyr are calculated according to the following [Formula 3] and [Formula 4] by substituting the roll axis angle for a variable θ for the control amount of the integral term Iy, wherein the roll axis angle is measured starting from the reference position of the wireless controlled airplane 1 as shown in FIG. 3:

$$Iyi=Iy*\sin\theta \quad \text{[Formula 3]}$$

$$Iyr=Iy*\cos\theta \quad \text{[Formula 4]}$$

The control signal generating section 59 calculates the control amount for the elevator servo motor 30 in the roll flight control mode by means of the integral term Wp calculated according to [Formula 5], in addition to the proportional term Pp and derivative term Dp calculated by the pitch axis control section 57. The control signal generating section 59 further calculates the control amount for the rudder servo motor 40 by means of the integral term Wy calculated according to [Formula 6], in addition to the proportional term Py and derivative term Dy calculated by the yaw axis control section 58. In this manner, the control amounts for correcting the change amount of the pitch axis rotation and the change amount of the yaw axis rotation are calculated depending on the change amount of the roll axis angle of the wireless controlled airplane 1.

$$Wp=Ipr+Iyi=Ip*\cos\theta+Iy*\sin\theta \quad \text{[Formula 5]}$$

$$Wy=Iyr-Ipi=Iy*\cos\theta-Ip*\sin\theta \quad \text{[Formula 6]}$$

With regard to the control amount for the aileron servo motor 20, it is calculated based on the proportional term Pr, integral term Ir and derivative term Dr calculated by the roll axis control section 56 in a similar manner to the normal control mode. The control signal generating section 59 generates the control signals based on the control amounts for the respective servo motors.

As an example, the integral term Ip and integral term Iy for the PID control is calculated by using [Formula 1] to [Formula 6] also in the normal control mode, wherein the integral term Wp and the integral term Wy are the integral term Ip and integral term Iy respectively by substituting "0" for the variable θ. With the above-described configuration, the present embodiment of the present invention is implemented.

<3. Exemplar Processes in an Arithmetic Section>

Figure 5:
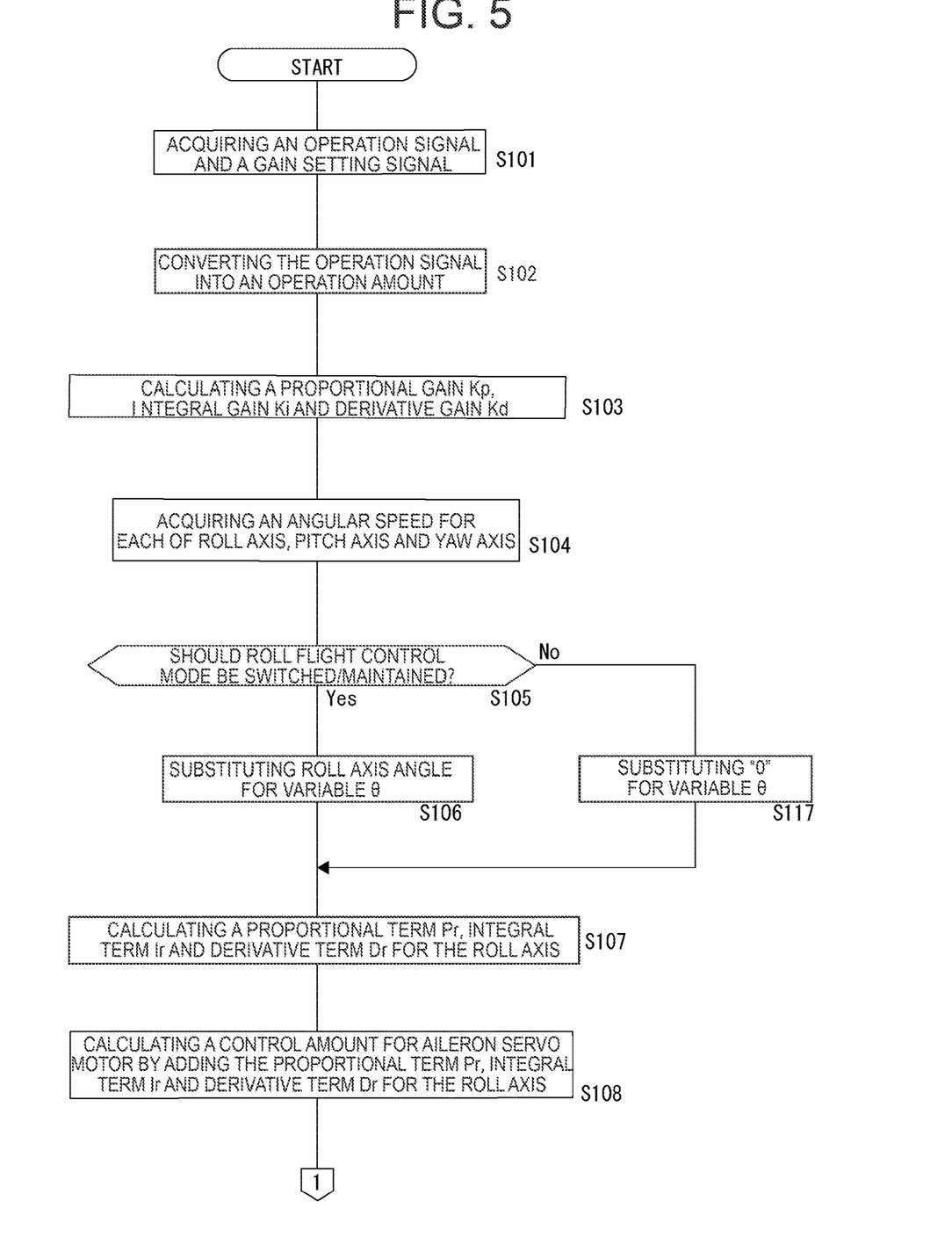
FIG. 5 shows a flowchart of processes in an arithmetic section according to an embodiment.
Figure 6:
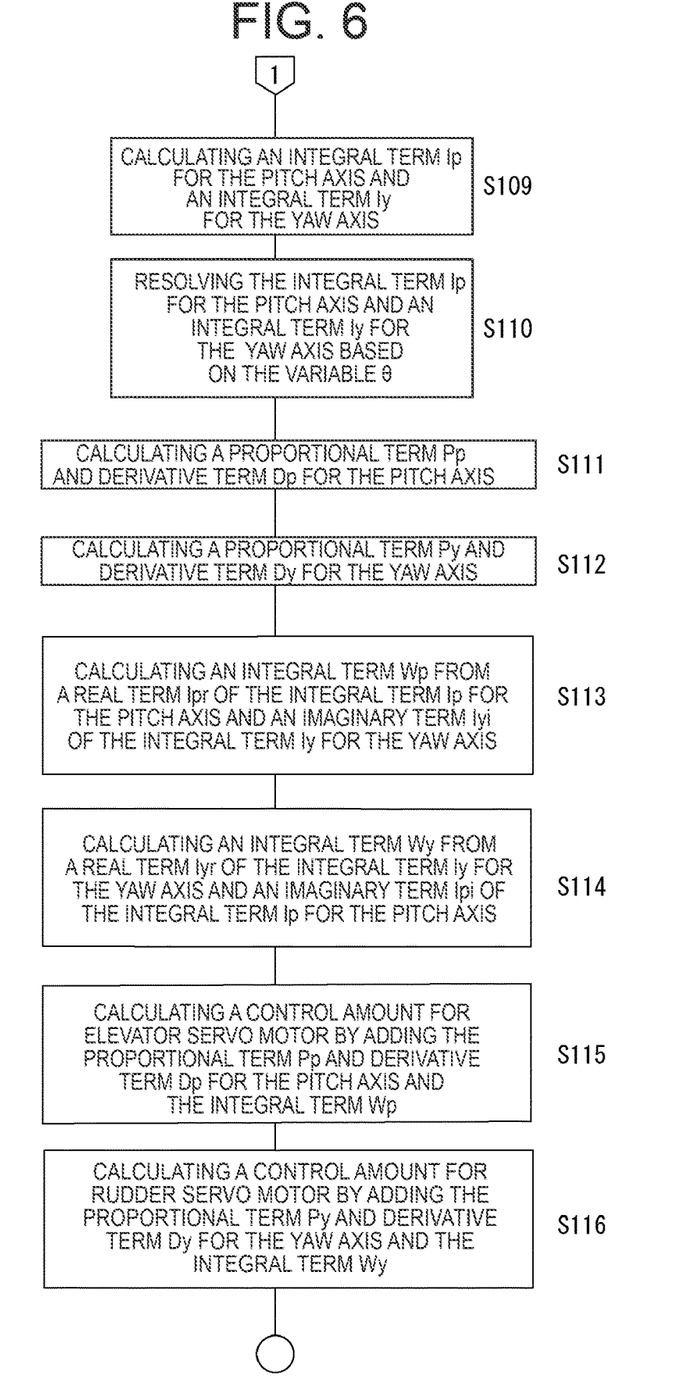
FIG. 6 shows a flowchart of processes in an arithmetic section according to an embodiment.

Exemplar processes carried out by the arithmetic section 53 for implementing the present embodiment will be described with reference to FIGS. 5 and 6. In the following description, it is assumed that the horizontal orientation of the wireless controlled airplane 1 is previously set as the reference pose for carrying out the processes as shown in FIGS. 5 and 6.

First, the arithmetic section 53 acquires the operation signal based on the input operation by the operator, and the gain setting signal in step S101, wherein the input operation has been received from the control device 2.

Then, the arithmetic section 53 converts the acquired operation signal into an operation amount for the roll axis, an operation amount for the pitch axis and an operation amount for the yaw axis in step S102. Furthermore, the arithmetic section 53 calculates a target angle around the roll axis based on the operation amount for the roll axis, a target angle around the pitch axis based on the operation amount for the pitch axis, and a target angle around the yaw axis based on the operation amount for the yaw axis.

Moreover, the arithmetic section 53 calculates the proportional gain Kp, integral gain Ki and derivative gain Kd for use in the PID control based on the acquired gain setting signal in step S103.

Subsequently, the arithmetic section 53 acquires the roll axis angular speed, pitch axis angular speed and yaw axis angular speed from the angular speed detecting section 52 in step S104. Here, the arithmetic section 53 calculates the roll axis angle from the reference pose to the current pose by integrating operation of the change amount of the roll axis angular speed for each constant time. The arithmetic section 53 further calculates the pitch axis angle from the reference pose to the current pose by integrating operation of the change amount of the pitch axis angular speed for each constant time. In a similar manner, the arithmetic section 53 calculates the yaw axis angle from the reference pose to the current pose by integrating operation of the change amount of the yaw axis angular speed for each constant time.

Thereafter, the arithmetic section 53 determines whether the control mode for the wireless controlled airplane 1 should be switched from the normal mode to the roll flight control mode or not, or whether the roll flight control mode should be maintained or not. For example, the arithmetic section 53 switches the control mode from the normal control mode to the roll flight control mode depending on a roll flight control request signal based on operation by the operator (e.g. based on an on-state of the roll flight control mode), the operation having been received from the control device 2. After switching to the roll flight control mode, the arithmetic section 53 further switches the control mode from the roll flight control mode to the normal control mode upon a normal control request signal based on operation by the operator.

As another example, the arithmetic section 53 may switch between the normal control mode and the roll flight control mode based on comparison of the change amount of the roll axis angle of the wireless controlled airplane 1 to a predetermined threshold. For example, the arithmetic section 53 may switch the control mode from the normal control mode to the roll flight control mode upon the roll axis angle being larger than a predefined threshold th. In this case, the arithmetic section 53 may switch the control mode from the roll flight control mode to the normal control mode upon the roll axis angle being equal to or lower than the threshold th.

As a combination of the above-described configurations, the arithmetic section 53 may switch the control mode from the normal control mode to the roll flight control mode when the arithmetic section 53 has received the roll flight control request signal from the control device 2 and the roll axis angle is larger than the threshold th. In this case, the arithmetic section 53 may switch the control mode from the roll flight control mode to the normal control mode upon the roll axis angle being equal to or lower than the threshold th, or upon receiving the roll flight control request signal from the control device 2.

In the roll flight control mode, the process in the arithmetic section 53 goes from step S105 to step S106. The arithmetic section 53 substitutes the roll axis angle for the variable θ in step S106. In this manner, the control amounts for correcting the change amount of the pitch axis rotation and the change amount of the yaw axis rotation of the airframe of the wireless controlled airplane 1 is calculated depending on the change amount of the roll axis angle of the wireless controlled airplane 1 in the process as described below.

Subsequently, the arithmetic section 53 calculates the proportional term Pr, integral term Ir and derivative term Dr for the PID control for the roll axis in step S107. Then, the arithmetic section 53 calculates the control amount for the aileron servo motor 20 by adding the proportional term Pr, integral term Ir and derivative term Dr in step S108. The control amount signal is outputted to the aileron servo motor 20 to control the operation of the aileron 6 depending on this control amount.

Further, the process in the arithmetic section 53 goes to step S109 according to FIG. 6, wherein the arithmetic section 53 calculates the integral term Ip for the pitch axis and the integral term Iy for the yaw axis for the PID control. Then, the arithmetic section 53 resolves the integral term Ip for the pitch axis and the integral term Iy for the yaw axis depending on the variable θ in step S110. Specifically, the arithmetic section 53 resolves the vector of the integral term Ip into the imaginary term Ipi for the horizontal direction and the real term Ipr for the direction of gravity, wherein resolution of the vector is accomplished based on the roll axis angle substituted for the variable θ according to [Formula 1] and [Formula 2] as mentioned above. The arithmetic section 53 further resolves the vector of the integral term Iy into the imaginary term Iyi for the direction of gravity and the real term Iyr for the horizontal direction, wherein resolution of the vector is accomplished based on the roll axis angle substituted for the variable θ according to [Formula 3] and [Formula 4] as mentioned above (see FIG. 4).

Furthermore, the arithmetic section 53 calculates the proportional term Pp and derivative term Dp for the pitch axis for the PID control in step S111, and calculates the proportional term Py and derivative term Dy for the yaw axis for the PID control in step S112.

In step S113, the arithmetic section 53 adds the real term Ipr of the integral term Ip for the pitch axis to the imaginary term Iyi of the integral term Iy for the yaw axis according to [Formula 5] as mentioned above to calculate the integral term Wp.

In step S114, the arithmetic section 53 further calculates the integral term Wy from the difference between the real term Iyr of the integral term Iy for the yaw axis and the imaginary term Ipi of the integral term Ip for pitch axis according to [Formula 6] as mentioned above.

In step S115, the arithmetic section 53 then adds the proportional term Pp and derivative term Dp for the pitch axis calculated in step S111 and the integral term Wp calculated in step S113 to calculate the control amount for the elevator servo motor 30. The control amount signal is outputted to the elevator servo motor 30 to control the operation of the elevator 7 depending on this control amount.

In step S116, the arithmetic section 53 further adds the proportional term Py and derivative term Dy for the yaw axis calculated in step S112 and the integral term Wy calculated in step S114 to calculate the control amount for the rudder servo motor 40. The control amount signal is outputted to the rudder servo motor 40 to control the operation of the rudder 8 depending on this control amount.

By using the integral term Wp for calculation of the control amount of the elevator servo motor 30 and by using the integral term Wy for calculation of the control amount of the rudder servo motor 40, it is possible to control the elevator servo motor 30 and rudder servo motor 40 independently from the roll axis angle of the wireless controlled airplane 1.

After step S116, the process in the arithmetic section 53 returns to step S101 according to FIG. 5 to repeat the above-described processes.

On the other hand, when the normal control mode is set in step S105 according to FIG. 5, the process in the arithmetic section 53 goes to step S117. In step S117, the arithmetic section 53 substitutes "0" for the variable θ.

In step S108, the arithmetic section 53 then adds the proportional term Pr, integral term Ir and derivative term Dr for the roll axis calculated in step S107 to calculate the control amount for the aileron servo motor 20.

In the following step S109 in FIG. 6, the arithmetic section 53 calculates the integral term Ip for the pitch axis and the integral term Iy for the yaw axis. Since "0" is substituted for the variable θ according to [Formula 1] and [Formula 2] by the arithmetic section 53 in step S110, the integral term Ip is equal to the real term Ipr, and the integral term Iy is equal to the real term Iyr, wherein the integral term Ip and integral term Iy are not resoluble based on the variable θ.

Furthermore, the process in the arithmetic section 53 goes to step S111, wherein the arithmetic section 53 calculates the proportional term Pp and derivative term Dp for the pitch axis, and then calculates the proportional term Py and the derivative term Dy for the yaw axis in step S112.

Then, the arithmetic section 53 calculates the integral term Wp according to [Formula 5] as mentioned above in step S113, wherein the integral term Wp is equal to the integral term Ip since "0" has been substituted for the variable θ. Similarly, in step S114, the integral term Wy is equal to the integral term Iy according to [Formula 6] in the arithmetic section 53.

In step S115, the arithmetic section 53 thus adds the proportional term Pp and derivative term Dp for the pitch axis calculated in step S111 and the integral term Ip as the integral term Wp calculated in step S113 to calculate the control amount for the elevator servo motor 30.

In step S116, the arithmetic section 53 further adds the proportional term Py and derivative term Dy for the yaw axis calculated in step S112 and the integral term Iy as the integral term Wy calculated in step S114 to calculate the control amount for the rudder servo motor 40.

Namely in the normal control mode, the control amounts for the elevator servo motor 30 and the rudder servo motor 40 are calculated without taking the change amount of the roll axis angle of the wireless controlled airplane 1 into account.

After step S116, the process in the arithmetic section 53 returns to step S101 according to FIG. 5 to repeat the above-described processes. In this manner, the processes in the arithmetic section 53 according to the present embodiment are implemented.

<4. Conclusion and Exemplar Variations>

The arithmetic processing device 50 according to the above-described embodiment includes the arithmetic section 53 configured to calculate the control amounts for correcting the change amount around the pitch axis (change amount of the integral term) and the change amount around the yaw axis (change amount of the integral term) for the wireless controlled airplane 1 depending on the change amount for the roll axis (change amount of the roll axis angle) for the wireless controlled airplane 1 (see S110, S113 and S114 in FIG. 6). The change amount for the roll axis of the wireless controlled airplane may not affect the change amount for the pitch axis and the change amount for the yaw axis. This results in maintaining the altitude of the wireless controlled airplane 1 which is performing a roll flight. In this manner, correction of the control amounts is accomplished for operation around the pitch axis and operation around the yaw axis which reflects the pose of the wireless controlled airplane 1 during rotation of the wireless controlled airplane 1 around the roll axis, so that an accuracy of roll flight control can be improved. This enables a roll flight to be performed with a simple operation even by an ordinary operator with few experiences and/or techniques. Furthermore, by correcting the control amount for the integral term I which is dominant in the PID control of the wireless controlled airplane 1, it is possible to perform the operation control for the roll flight effectively.

The arithmetic processing device 50 calculates the angle around the roll axis from the reference pose to the current pose for the wireless controlled airplane as the change amount (variable θ) by the integrating operation with the angular speed around the roll axis for the wireless controlled airplane 1 (see S106 in FIG. 5). In this manner, the vector of the change amount (integral term Ip) for the pitch axis is resolved into the imaginary term Ipi and the real term Ipr, and the vector of the change amount (integral term Iy) for the yaw axis is resolved into the imaginary term Iyi and the real term Iyr based on the angle around the roll axis (see FIG. 4), wherein the control amount Wp for the airframe in the direction of gravity is calculated by adding the real term Ipr for the pitch axis to the imaginary term Iyi for yaw axis, and the control amount Wy for the airframe in the horizontal direction is calculated from the difference between the imaginary term Ipi for the pitch axis and the real term Iyr for the yaw axis. Thus, for the wireless controlled airplane 1 which is rotated around the roll axis during the roll flight, it is possible to accomplish the operation control for the pitch axis and the yaw axis which reflect the current pose of the wireless controlled airplane 1.

The arithmetic processing device 50 initiates calculation of the control amount upon the signal based on operation by the operator of the wireless controlled airplane 1 (see S105 in FIG. 5). In this manner, the control mode is switchable between the normal control mode and the roll flight control mode via the operation by the operator. Due to the control mode being switchable via the operation by the operator, it is possible to switch to a suited control mode depending on a flight mode of the wireless controlled airplane 1, whereby a comfortable control can be accomplished for the operator.

The arithmetic processing device 50 initiates calculation of the control amount based on the comparison of the change amount around the roll axis (roll axis angle) with the predetermined threshold th (see S105 in FIG. 5). This enables that it is automatically switched depending on the change amount around the roll axis for the wireless controlled airplane 1 during flight whether calculation of the control amount is carried out or not. In this manner, it is possible to switch the control mode as necessary without operation by the operator, which enables the wireless controlled airplane 1 to be controlled by the operator with a simplified operation.

According to the present embodiment, the wireless controlled airplane 1 is configured to be controlled via wireless communication and includes an arithmetic processing device, wherein the arithmetic processing device is configured to calculate the control amount for correcting the change amount around the pitch axis (change amount of the integral term) and the change amount around the yaw axis (change amount of the integral term) for the wireless controlled airplane depending on the change amount for the roll axis (change amount of the roll axis angle) for the wireless controlled airplane 1 (see S110, S113 and S114 in FIG. 6). The wireless controlled airplane 1 with the above-described arithmetic processing device 50 integrated therein can also achieve effects which are similar to the above-described effects.

Although the arithmetic processing device 50 according to the present embodiment has been described by means of an example in which the arithmetic processing device 50 is integrated into the wireless controlled airplane 1, the arithmetic processing device 50 may be provided at the control device 2, or at another external device.

Further, although in the above description, the wireless controlled airplane 1 according to the present embodiment is configured as an airplane with the horizontal tails 4 and vertical tails 5, the wireless controlled airplane 1 according to the present embodiment is not limited thereto, but may be also applied to a V-tail airplane or a T-tail airplane.

It is to be noted that the effects described in the present disclosure are merely illustrative and the effects of the present disclosure are not limited thereto. The present invention may achieve other effects, or some of the effects described in the present disclosure. The embodiment described in the present disclosure is merely illustrative, and the present invention is not limited to the above-described embodiment. Therefore, it is to be understood that the above-described embodiment may be modified in various manners depending on the design etc., and the present invention includes such other modifications as long as they do not depart from the technical idea of the present invention. Furthermore, it may be necessary to provide only some of the combinations of features described in the present embodiment in order to achieve the objective.

REFERENCE SIGNS LIST

1 Wireless controlled airplane
2 Control device
6 Ailerons
7 Elevators
8 Rudders
20 Aileron servo motor(s)
30 Elevator servo motor(s)
40 Rudder servo motor(s)
50 Arithmetic processing device
52 Angular speed detecting section
53 Arithmetic section
55 Angle detecting section
56 Roll axis control section
57 Pitch axis control section
58 Yaw axis control section
59 Control signal generating section

What is claimed is:
1. An arithmetic processing device comprising:
an arithmetic section configured to calculate control amounts for correcting a change amount around a pitch axis and a change amount around a yaw axis for a wireless controlled airplane depending on a change amount for a roll axis for the wireless controlled airplane,
wherein the arithmetic section is configured to:
resolve a vector for the change amount around the pitch axis into an imaginary term for a horizontal direction and a real term for a direction of gravity based on the change amount for the roll axis, and resolve a vector for the change amount around the yaw axis into an imaginary term for the direction of gravity and a real term for the horizontal direction based on the change amount for the roll axis; and
calculate a control amount for an airframe of the wireless controlled airplane in the direction of gravity by adding the real term around the pitch axis to the imaginary term around the yaw axis, and calculate a control amount for the airframe in the hori- zontal direction from a difference between the imaginary term around the pitch axis and the real term around the yaw axis.

2. The arithmetic processing device according to claim 1, wherein an angle around the roll axis from a reference pose to a current pose for the wireless controlled airplane is calculated as the change amount by an integrating operation with an angular speed around the roll axis for the wireless controlled airplane.

3. The arithmetic processing device according to claim 2, wherein calculation of the control amounts is initiated upon a signal based on operation by an operator of the wireless controlled airplane.

4. The arithmetic processing device according to claim 3, wherein calculation of the control amounts is initiated based on a comparison of the change amount around the roll axis with a predetermined threshold.

5. The arithmetic processing device according to claim 2, wherein calculation of the control amounts is initiated based on a comparison of the change amount around the roll axis with a predetermined threshold.

6. The arithmetic processing device according to claim 1, wherein calculation of the control amounts is initiated upon a signal based on operation by an operator of the wireless controlled airplane.

7. The arithmetic processing device according to claim 6, wherein calculation of the control amounts is initiated based on a comparison of the change amount around the roll axis with a predetermined threshold.

8. The arithmetic processing device according to claim 1, wherein calculation of the control amounts is initiated based on a comparison of the change amount around the roll axis with a predetermined threshold.

9. A wireless controlled airplane configured to be controlled via wireless communication, comprising:
an arithmetic processing device configured to calculate control amounts for correcting a change amount around a pitch axis and a change amount around a yaw axis for the wireless controlled airplane depending on a change amount for a roll axis for the wireless controlled airplane,
wherein the arithmetic processing device is configured to:
resolve a vector for the change amount around the pitch axis into an imaginary term for a horizontal direction and a real term for a direction of gravity based on the change amount for the roll axis, and resolve a vector for the change amount around the yaw axis into an imaginary term for the direction of gravity and a real term for the horizontal direction based on the change amount for the roll axis; and
calculate a control amount for an airframe of the wireless controlled airplane in the direction of gravity by adding the real term around the pitch axis to the imaginary term around the yaw axis, and calculate a control amount for the airframe in the horizontal direction from a difference between the imaginary term around the pitch axis and the real term around the yaw axis.

* * * * *